(12) United States Patent
Kuo et al.

(10) Patent No.: US 6,994,072 B2
(45) Date of Patent: Feb. 7, 2006

(54) METHOD FOR MID LOAD OPERATION OF AUTO-IGNITION COMBUSTION

(75) Inventors: Tang-Wei Kuo, Troy, MI (US); Barry L. Brown, Lake Orion, MI (US); James A. Eng, Troy, MI (US); Paul M. Najt, Bloomfield Hills, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/997,661

(22) Filed: Nov. 24, 2004

(65) Prior Publication Data

US 2006/0005804 A1 Jan. 12, 2006

Related U.S. Application Data

(60) Provisional application No. 60/587,104, filed on Jul. 12, 2004.

(51) Int. Cl.
*F02B 17/00* (2006.01)
(52) U.S. Cl. .................. 123/295; 123/305
(58) Field of Classification Search ............ 123/295, 123/305, 299, 90.15
See application file for complete search history.

(56) References Cited

U.S. PATENT DOCUMENTS

| 6,082,342 | A | 7/2000 | Duret et al. ............ 123/568.14 |
| 6,386,177 | B2 * | 5/2002 | Urushihara et al. ......... 123/299 |
| 6,497,213 | B2 * | 12/2002 | Yoshizawa et al. ......... 123/299 |
| 6,619,255 | B2 * | 9/2003 | Urushihara et al. ......... 123/295 |
| 6,636,197 | B1 | 10/2003 | Goldenberg et al. ........ 345/156 |
| 6,640,773 | B2 * | 11/2003 | Ancimer et al. ............ 123/299 |

FOREIGN PATENT DOCUMENTS

| WO | WO 01/46571 | 6/2001 |
| WO | WO 01/46572 | 6/2001 |
| WO | WO 01/46573 | 6/2001 |

OTHER PUBLICATIONS

SAE Technical paper Series #980495, "Fuel Injection Strategies to Increase Full-Load Torque Output of a Direct-Injection SI Engine", Jialin Yang and Richard W. Anderson; Feb. 23-26, 1998.

* cited by examiner

*Primary Examiner*—Mahmoud Gimie
(74) *Attorney, Agent, or Firm*—Kathryn A. Marra

(57) ABSTRACT

A method is disclosed for expanding the mid load operation limit in a four-stroke gasoline direct-injection controlled auto-ignition combustion engine. A system is employed for variably actuating the intake and exhaust valves and for operating the valves with an exhaust re-compression or exhaust re-breathing valve strategy. A spark plug is provided. A fuel injector having multiple injection capability is employed. A first fuel charge is injected into the combustion chamber to form a lean air-fuel mixture. A second fuel charge is injected into the combustion chamber to form a stratified air-fuel mixture having an ignitable mixture located near the spark plug. The ignitable mixture is ignited at the spark gap, thereby causing spark-ignition combustion that causes a sufficient increase in chamber pressure and temperature to trigger auto-ignition of the lean air-fuel mixture, resulting in the obtaining of a higher engine load before a pressure rise rate in the combustion chamber exceeds a prescribed threshold value.

12 Claims, 6 Drawing Sheets

METHOD FOR MID LOAD OPERATION OF AUTO-IGNITION COMBUSTION

CROSS-REFERENCE TO RELATED APPLICATIONS

This application claims priority from U.S. Provisional Patent Application No. 60/587,104 filed Jul. 12, 2004.

TECHNICAL FIELD

This invention relates to a method for extending the mid load operation limit in a gasoline direct-injection controlled auto-ignition combustion engine.

BACKGROUND OF THE INVENTION

To improve thermal efficiency of gasoline internal combustion engines, dilute combustion, using either air or re-circulated exhaust gas, is known to give enhanced thermal efficiency and low NOx emissions. There is, however, a limit at which an engine can be operated with a diluted mixture because of misfire and combustion instability as a result of a slow burn. Known methods to extend the dilution limit include: 1) improving ignitability of the mixture by enhancing ignition and fuel preparation; 2) increasing the flame speed by introducing charge motion and turbulence; and 3) operating the engine under controlled auto-ignition combustion.

The controlled auto-ignition process is sometimes called a Homogeneous Charge Compression Ignition (HCCI) process. In this process, a mixture of combusted gases, air, and fuel is created and auto-ignition is initiated simultaneously from many ignition sites within the mixture during compression, resulting in very stable power output and high thermal efficiency. The combustion is highly diluted and uniformly distributed throughout the charge. Therefore, the burned gas temperature and hence NOx emissions are substantially lower than that of traditional spark ignition engines based on propagating flame front and diesel engines based on an attached diffusion flame. In both spark ignition and diesel engines, the burned gas temperature is highly heterogeneous within the mixture with very high local temperatures creating high NOx emission.

Engines operating under controlled auto-ignition combustion have been successfully demonstrated in two-stroke gasoline engines using a conventional compression ratio. It is believed that the high proportion of burned gases remaining from the previous cycle, i.e., the residual content, within the two-stroke engine combustion chamber is responsible for providing the high mixture temperature necessary to promote auto-ignition in a highly diluted mixture. In four-stroke engines with traditional valve means, the residual content is low, and controlled auto-ignition at part load is difficult to achieve. Known methods to induce controlled auto-ignition at low and part loads include: 1) intake air heating; 2) variable compression ratio; and 3) blending gasoline with ignition promoters to create a more easily ignitable mixture than gasoline. In all the above methods, the range of engine speeds and loads in which controlled auto-ignition combustion can be achieved is relatively narrow.

Engines operating under controlled auto-ignition combustion have been demonstrated in four-stroke gasoline engines using variable valve actuation with unconventional valve means. The following are descriptions of two such valve strategies, specifically an exhaust re-compression valve strategy and an exhaust re-breathing valve strategy. With either valve strategy, a high proportion of residual combustion products from previous combustion cycles is retained to provide the necessary conditions for auto-ignition in a highly diluted mixture. The range of engine speeds and loads in which controlled auto-ignition combustion can be achieved is greatly expanded using a conventional compression ratio.

One such valve strategy is an exhaust re-compression valve strategy. A four-stroke internal combustion engine has been disclosed that provides for auto-ignition by controlling the motion of the intake and exhaust valves of a combustion chamber to ensure that a fuel/air charge is mixed with combusted gases to generate conditions suitable for auto-ignition. In particular, this engine operates with a mechanically cam-actuated exhaust valve that is closed earlier in the exhaust stroke than normal four-stroke engines to trap combusted gases for subsequent mixing with an intake of a fuel and air mixture.

Further, a similar method of operating a four-stroke internal combustion engine has been disclosed in which combustion is achieved at least partially by an auto-ignition process. Flows of fuel/air charge and combusted gases are regulated by hydraulically controlled valve means in order to generate conditions in the combustion chamber suitable for auto-ignition operation.

The valve means used includes an intake valve controlling flow of the fuel/air mixture into the combustion chamber from an inlet passage and an exhaust valve controlling flow of exhaust combusted gases from the combustion chamber to an exhaust passage. The exhaust valve opens (EVO) at approximately 10 to 15 degrees before bottom dead center in the expansion stroke, and closes (EVC) during the exhaust stroke in a range of 90 to 45 degrees before top dead center. The intake valve is opened (IVO) later in the four-stroke cycle than usual in a normal four-stroke engine in a range of 45 to 90 degrees after top dead center during the intake stroke.

The early exhaust valve closing and late intake valve opening provides a negative valve overlap period (EVC–IVO) where both exhaust and intake valves are closed for trapping of combusted gas, which later mixes with the inducted fuel/air charge during the intake stroke and thereby promotes the auto-ignition process. The intake valve is then closed (IVC) roughly 30 degrees after bottom dead center in the compression stroke. This is generally referred to as an exhaust re-compression valve strategy.

A similar method of operating a direct-injection gasoline four-stroke internal combustion engine has been disclosed in which combustion is achieved at least partially by an auto-ignition process. Flows of air and combusted gases are regulated by the hydraulically controlled valve means as detailed above. The fuel is delivered directly into the combustion chamber by a gasoline injector. The gasoline injector is said to inject fuel during either the intake stroke or the subsequent compression stroke in a single engine cycle.

Furthermore, a system and a method for operating a four-stroke internal combustion engine has been disclosed in which part load operation is achieved by an auto-ignition process. Flows of air and combusted gases are regulated by either mechanical (phase shift of a single cam or shift between two different cams) or electromagnetic valve means similar to that described above. Control of the auto-ignition process is divided into three modes depending upon the magnitude of a predetermined operating parameter. The operating parameter is indicative of either the engine load or the engine speed. The three auto-ignition combustion modes are: a gasoline reform auto-ignition combustion mode, an auto-ignition stratified charge combustion mode, and an auto-ignition homogeneous charge combustion mode.

In the gasoline reform auto-ignition combustion mode that may be selected during operation with low part load, a first fuel injection during the negative valve overlap period produces a sufficient amount of chemical reaction for promotion of auto-ignition of the fuel/air mixture produced by a second fuel injection during the subsequent compression stroke. The fuel quantity for the first injection is said to be either constant or inversely proportional to the engine load. The corresponding injection timing, however, is said to be either retarded in a continuous manner or held constant as the engine load increases. In the auto-ignition stratified charge combustion mode that may be selected during operation with intermediate part load, a fuel injection during the compression stroke supports auto-ignition. The injection timing advances as the engine load increases. In the auto-ignition homogeneous charge combustion mode that may be selected during operation with high part load, a fuel injection during the intake stroke supports auto-ignition. The injection timing is disclosed to be invariant against variation of engine load.

We have demonstrated a strategy for operating a direct-injection gasoline four-stroke internal combustion engine with enhanced controlled auto-ignition combustion from low to medium load. Flows of air and combusted gases are regulated by either electro-hydraulically controlled valve means (fully-flexible valve actuation) similar to that described above or mechanically controlled valve means (phase shift of a single cam or shift between two different cams) similar to that described above. The valve means is used in conjunction with a gasoline direct injector having multiple injection capability during a single engine cycle. The injection timing of fuel injection and the proportion of fuel split, if desired, are electronically controlled. Different negative valve overlap periods and different injection strategies are required at different engine load for optimal control of combustion phasing hence engine performance.

Control of the auto-ignition process is divided into three stages from low to medium load. It is experimentally confirmed that for maintaining optimal auto-ignition combustion phasing throughout the stated load range, the negative valve overlap period increases with decreasing engine load. Further, during operation with low part load (Stage 1), a first injection of a fixed amount of fuel during the negative valve overlap period produces a sufficient amount of heat and chemical species that are more reactive than the fuel for promotion of auto-ignition of the fuel/air mixture produced by a second fuel injection during the subsequent compression stroke. The injection timing for the first injection retards and the injection timing for the second injection advances in a continuous manner as the engine load increases. During operation with intermediate part load (Stage 2), a first injection of fuel during the negative valve overlap period followed immediately by a second injection of fuel during the subsequent intake stroke supports auto-ignition. Optimal separation of the two injections is around 30 to 60 degrees crank angle. The injection timings of both injections retard in a continuous manner as the engine load increases. During operation with high part load (Stage 3), a single fuel injection during the intake stroke supports auto-ignition. The injection timing retards as the engine load increases. The invention has been shown to be effective in extending the load range of a direct-injection gasoline four-stroke auto-ignition engine using a conventional compression ratio.

A second valve strategy is an exhaust re-breathing valve strategy. A method of operating a four-stroke internal combustion engine has been disclosed in which combustion is achieved at least partially by an auto-ignition process. Flow of fuel/air charge and combusted gases are regulated by hydraulically controlled valve means in order to generate conditions in the combustion chamber suitable for auto-ignition operation. The valve means used includes an intake valve controlling flow of fuel/air mixture into the combustion chamber from an inlet passage and an exhaust valve controlling flow of exhaust combusted gases from the combustion chamber to an exhaust passage. The exhaust valve is opened for two separate periods during the same four-stroke cycle. The exhaust valve is opened for a first period to allow combusted gases to be expelled from the combustion chamber. The exhaust valve is opened for a second period to allow combusted gases previously exhausted from the combustion chamber to be drawn back into the combustion chamber. The double opening of the exhaust valve during each four-stroke cycle creates the necessary condition for auto-ignition in the combustion chamber. This is generally referred to as an exhaust re-breathing valve strategy.

We have demonstrated a method of operating a direct-injection gasoline four-stroke internal combustion engine with extended capability for controlling the auto-ignition process at low engine load. In this method, a valve strategy that employs the double opening of the exhaust valve and a single opening of the intake valve is used in conjunction with a gasoline direct injector having multiple injection capability during a single engine cycle. Both the intake and exhaust valve means are hydraulically controlled. By appropriately choosing the closing timing of the exhaust valve for the first opening event and the opening timings of both the intake valve and the exhaust valve for the second opening event, different levels of in-cylinder vacuum can be generated. Higher in-cylinder vacuum leads to increased charge temperature at intake valve closing and results in improved combustion stability for a controlled auto-ignition engine.

The combustion stability of the engine is further improved with an intelligent split-injection strategy that features two injections per engine cycle. The first injection event delivers 10–30% of the total injected fuel per cycle into the combustion chamber during the early part of the intake stroke while the second injection event delivers the remaining fuel during the later part of the compression stroke. The injection timing of each injection event and the proportion of fuel split are electronically controlled. Different levels of in-cylinder vacuum and split-injection strategies are required at different engine loads for optimal control of combustion phasing and engine performance. Both demonstrations have been shown to effectively extend the low load limit of direct-injection gasoline four-stroke auto-ignition engines.

We have also demonstrated a strategy for operating a direct-injection gasoline four-stroke internal combustion engine with enhanced controlled auto-ignition combustion from low to medium load. Flows of air and combusted gases are regulated by either electro-hydraulically controlled valve means (fully-flexible valve actuation) similar to that described above or mechanically controlled valve means (phase shift of a single cam or shift between two different cams). The valve means is used in conjunction with a gasoline direct injector having multiple injection capability during a single engine cycle similar to that described above. The injection timing of fuel injection and the proportion of fuel split, if desired, are electronically controlled. Different levels of in-cylinder vacuum and injection strategies are required at different engine loads for optimal control of combustion phasing and hence engine performance. Control of the auto-ignition process is divided into two stages from low to high part load.

It is experimentally confirmed that for maintaining optimal auto-ignition combustion phasing throughout the load range, the required in-cylinder vacuum decreases with increasing engine load. Further, during operation with low part load, a first injection of 10–30% of total injected fuel during the early part of the intake stroke promotes auto-ignition of the fuel/air mixture produced by a second fuel injection during the subsequent compression stroke. The injection timing for the first injection retards and the injection timing for the second injection advances in a continuous manner as the engine load increases to avoid excessive smoke emission. During operation with intermediate and high part loads, a single fuel injection during the intake stroke supports auto-ignition. The injection timing retards as the engine load increases to avoid excessive smoke emission. The invention has been shown to be effective in extending the load range of a direct-injection gasoline four-stroke auto-ignition engine using a conventional compression ratio.

The above descriptions depict our methodologies in operating gasoline direct-injection controlled auto-ignition combustion engines over extensive speed and load ranges under steady state operations. In general, the engine operation is limited by combustion stability at low load and by in-cylinder pressure rise or amplitude of pressure oscillation at high load. Too large a pressure rise or amplitude of pressure oscillation results in a combustion-generated noise called knocking. It has been found experimentally that retarding the combustion timing from top dead center reduces the combustion rate and is an effective way to prevent knocking. Parameters such as spark timing, injection timing, and internally/externally re-circulated burned gas are effective in controlling the combustion rate. In general, the higher the load, the more retarded the location of peak pressure that is required. With retarded combustion, however, both the start of combustion and combustion stability are substantially influenced by cycle-to-cycle variations of in-cylinder conditions. Therefore, an ignition timing control method is required in conjunction with the combustion rate control method to achieve stable retarded combustion.

A fuel injection strategy has been disclosed to increase full-load-torque output of a direct-injection SI engine. A split injection strategy was proposed. A portion of total injected fuel is injected during the intake stroke for volumetric efficiency improvement and the remaining fuel is injected late during the compression stroke for reducing knocking. Test results showed that the split-injection strategy increases the IMEP of the engine by about 2–3 percent over that of the single injection strategy at full load. Both injection timing and amount of split are conjectured to be speed and load dependent.

An engine has been disclosed that has a fuel injection system capable of performing a multiple injection wherein a main injection event and a trigger injection event take place in this order in one cycle. During the main injection, fuel is widely dispersed within a combustion chamber to create a main mixture for main combustion. During the trigger injection, fuel is dispersed locally within the combustion chamber to create an ignitable mixture for auto-ignition. Auto-ignition of the ignitable mixture creates conditions under which auto-ignition of the main mixture takes place. Fuel quantity and timing for each of the main and trigger injections are varied corresponding to engine speed and load request to cause the main mixture to burn at a target crank angle after TDC of the compression stroke.

A two-stage combustion process employing split injection and spark ignition has also been disclosed. The spark is used for ignition timing control while the split injection is used to create a stratified air/fuel mixture charge. The stratified charge includes an ignitable air/fuel mixture portion around a spark plug within the surrounding lean air/fuel mixture. The first stage is combustion of the ignitable air/fuel mixture portion initiated by a spark produced by the spark plug, providing an additional increase of cylinder pressure. The second stage is auto-ignited combustion of the surrounding lean air/fuel mixture induced by such additional cylinder pressure increase. The concept was validated in a gasoline direct-injection controlled auto-ignition combustion engine under lean operation with air dilution. There is concern about an increase in Nitric Oxides (NOx) emissions due to spark ignition combustion that may require an expensive lean NOx after-treatment device for emission control.

The subject matter of the foregoing paragraphs 14, 15 and 17 through 21 was drawn from unpublished materials of the assignee of the present invention and is presented here as related information that is not considered to be prior art.

SUMMARY OF THE INVENTION

The present invention provides a method for extending the mid load operation limit of a gasoline direct-injection controlled auto-ignition combustion engine that is capable of using conventional three-way after-treatment systems as engine-out emission control devices. The method employs a fuel injector with multiple injection capability and a spark plug. It is found experimentally that, with present invention, the mid load operation limit can be increased by more than 10%.

The present invention is as follows. Using our current methodology in operating a gasoline direct-injection controlled auto-ignition combustion engine, an injection strategy with a single fuel injection during the intake stroke is sufficient from part load to the high load operation limit. An overall lean or stoichiometric in-cylinder air-fuel mixture is generated by direct fuel injection and with an intake charge that is diluted by either air or externally re-circulated burned gas for combustion phasing and knocking control. The stoichiometric air/fuel mixture is used whenever the engine-out NOx emission index exceeds 1 g/kg fuel so that conventional three-way after-treatment systems can be used for engine-out emission control. With this strategy, the high load operation limit is reached by either pressure rise or an amplitude of pressure oscillation that exceeds a prescribed threshold value.

It is well known that the in-cylinder air-fuel distribution is greatly influenced by injection timing and the amount of fuel split with the split injection strategy from earlier diesel and direct gasoline injection works. For the present invention, the first fuel injection occurs early in the intake stroke to form a lean air-fuel mixture throughout the combustion chamber near the end of the compression stroke. The second fuel injection takes place in either a middle or later part of the intake stroke to create a stratified air-fuel mixture with an ignitable mixture near the spark plug. The spark plug is used to ignite the ignitable mixture and its timing strongly influences the combustion phasing. The spark-ignition combustion causes a sufficient rise in cylinder pressure and temperature to trigger auto-ignition of the remaining lean air-fuel mixture to burn at a target crank angle after TDC of the compression stroke. In this way, a mixed-mode combustion process that consists of two separate yet related processes is realized. Further, the engine is operated with overall stoichiometry with external EGR dilution so a traditional three-way after-treatment device is sufficient for engine-out emission control. The external EGR dilution also acts as an effective combustion rate control parameter during the auto-ignition combustion phase. With the present invention, the high load limit of a gasoline direct-injection controlled auto-ignition combustion engine is expanded by more than 10% with an acceptable pressure rise rate or amplitude of pressure oscillation.

The present invention applies equally well to both valve strategies described above. In the following, only test results from the exhaust re-compression valve strategy are presented to demonstrate its effectiveness.

These and other features and advantages of the invention will be more fully understood from the following description of certain specific embodiments of the invention taken together with the accompanying drawings.

DESCRIPTION OF THE PREFERRED EMBODIMENT

In general, the present invention teaches a method for expanding the mid load operation limit in a four-stroke gasoline direct-injection controlled auto-ignition combustion engine. A system is employed for variably actuating the intake and exhaust valves and for operating the valves with either an exhaust re-compression or an exhaust re-breathing valve strategy. A spark plug is provided and a fuel injector having multiple injection capability is employed. Early in the intake stroke, a first fuel charge is injected into the combustion chamber to form a lean air-fuel mixture in the chamber. Later in the intake stroke, a second fuel charge is injected into the combustion chamber to form a stratified ignitable air-fuel mixture concentrated near the spark plug. The overall mixture is maintained stoichiometric so a traditional three-way after treatment device may be used for exhaust emission control. At a controlled timing before top dead center of the compression stroke, the ignitable mixture is ignited at the spark gap, initiating spark-ignition combustion that causes a sufficient increase in chamber pressure and temperature to trigger auto-ignition of the lean air-fuel mixture. The mixture is diluted with controlled internal and external EGR for controlling the burn rate such that higher engine load is attainable before the pressure rise rate in the combustion chamber exceeds a prescribed threshold value. For simplicity, the following descriptions will address the present invention in its application to a single cylinder direct-injection gasoline four-stroke internal combustion engine, although it should be appreciated that the present invention is equally applicable to a multi-cylinder direct-injection gasoline four-stroke internal combustion engine.

Figure 1:
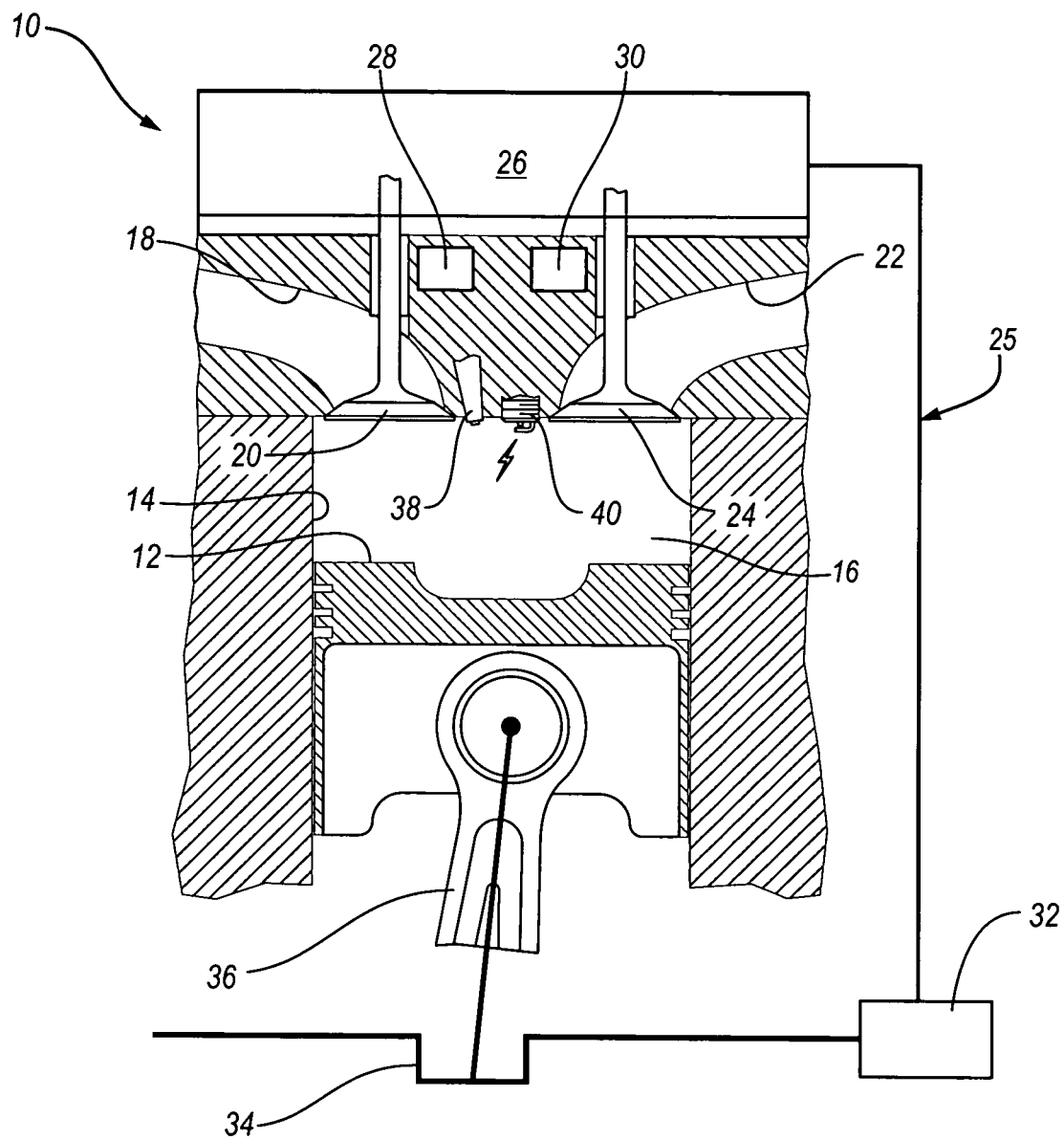
FIG. 1 is a schematic illustration of a single cylinder direct-injection gasoline four-stroke internal combustion engine according to the present invention.

A schematic representation of an embodiment of a single-cylinder direct-injection four-stroke internal combustion engine 10 is shown in FIG. 1. In FIG. 1, a piston 12 is movable in a cylinder 14 and defines with the cylinder 14 a variable volume combustion chamber 16. An intake passage 18 supplies air into the combustion chamber 16. Flow of air into the combustion chamber 16 is controlled by intake valve 20. Combusted gases can flow from the combustion chamber 16 via an exhaust passage 22 and flow of combusted gases through the exhaust passage 22 is controlled by exhaust valve 24.

The engine 10 of the present invention has a hydraulically controlled valve train 25 with an electronic controller 26 which is programmable and hydraulically controls the opening and closing of both the intake 20 and exhaust 24 valves. The electronic controller 26 will control the movement of the intake valve 20 and exhaust valve 24 having regard to the position of the intake and exhaust valves 20 and 24 as measured by two position transducers 28 and 30. The controller 26 will also have regard to the position of the engine, which will be measured by a rotation sensor 32 that is connected to a crankshaft 34 of the internal combustion engine. The crankshaft 34 is connected by a connecting rod 36 to the piston 12 reciprocate in the cylinder 14.

A gasoline direct injector 38, controlled by the electronic controller 26, is used to inject fuel directly into the combustion chamber 16. A spark plug 40, controlled also by the electronic controller 26, is used to enhance the ignition timing control of the engine according to the present invention.

Figure 2:
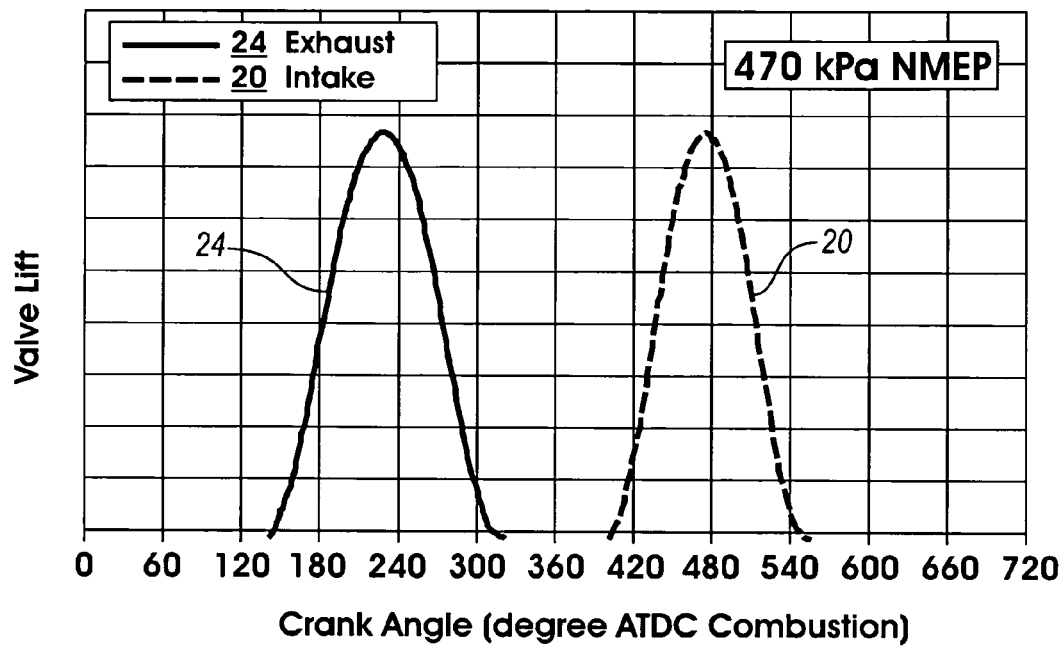
FIG. 2 is a graph of valve lift profiles as a function of crank angle for the exhaust and intake valves of a four-stroke internal combustion engine (at 1000 rpm/470 kPa NMEP) using an exhaust re-compression valve strategy via a FFVA system.

Control of the motion of the intake valve 20 and exhaust valve 24 in accordance with an exhaust re-compression valve strategy is illustrated in FIG. 2 for a controlled auto-ignition combustion engine operating at 1000 rpm and 470 kPa net mean effective pressure (NMEP) and using a fully flexible valve actuation (FFVA) system. This is the mid load operation limit for the engine at 1000 rpm. In FIG. 2, the exhaust valve 24 is seen to open at approximately 30 degrees before bottom dead center in the expansion stroke, and to close during the exhaust stroke approximately 40 degrees before top dead center. The intake valve 20 is opened later in the engine cycle than in a normal spark ignition engine approximately 40 degrees after top dead center during the intake stroke. The early exhaust valve closing and late intake valve opening provides a negative valve overlap period where both the exhaust 24 and intake valves 20 are closed for trapping of combusted gas which later mixes with the fuel/air charge inducted during the intake stroke and thereby promotes the auto-ignition process. The intake valve 20 then closes roughly 10 degrees after bottom dead center in the compression stroke.

Figure 3:
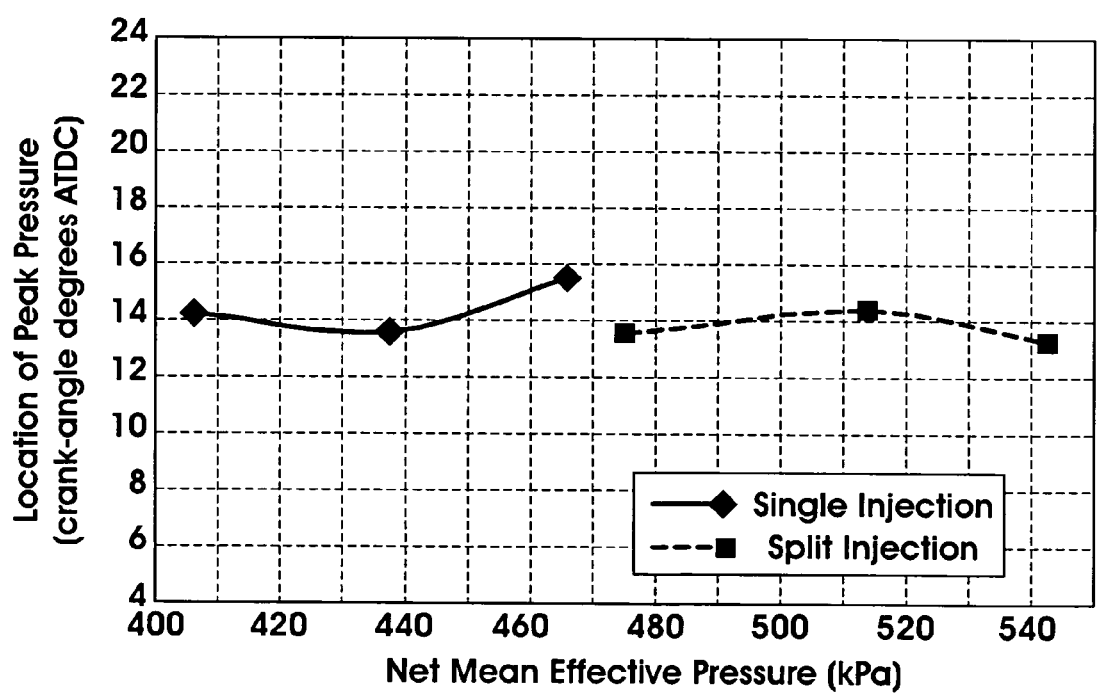
FIG. 3 is a graph of the location of peak pressure as a function of engine load using single and split injection strategies.
Figure 4:
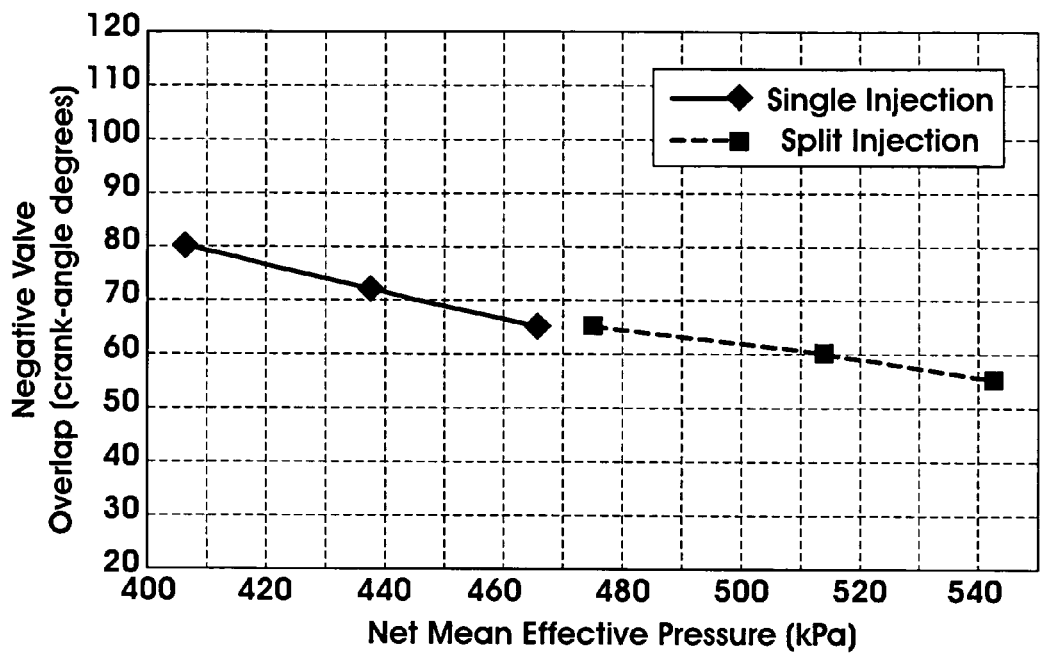
FIG. 4 is a graph of the negative valve overlap required as a function of engine load using single and split injection strategies.

FIG. 3 shows the location of peak pressure (LPP) as a function of engine load with single injection (line with diamonds) and split injection (line with squares) strategies for engine operation with a speed of 1000 rpm and a stoichiometric air-fuel ratio. In particular, FIG. 3 shows that a constant LPP was maintained at different loads with proper selection of the negative valve overlap period as illustrated in FIG. 4. In general, the negative valve overlap period decreases with increasing engine load for both injection strategies.

Figure 5:
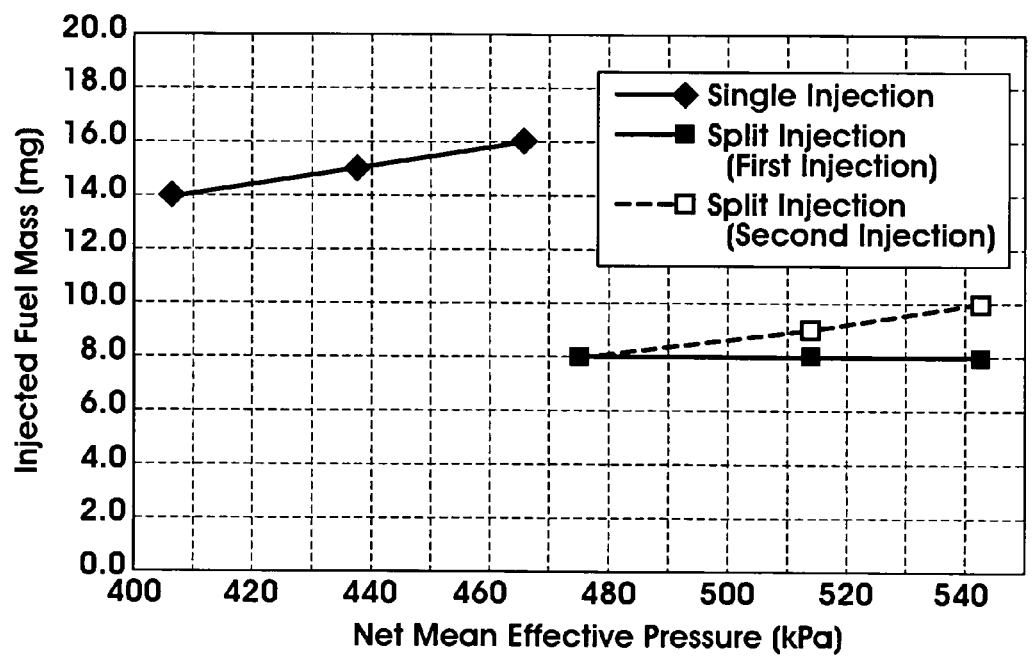
FIG. 5 is a graph of the injected fuel mass as a function of engine load using single and split injection strategies.
Figure 6:
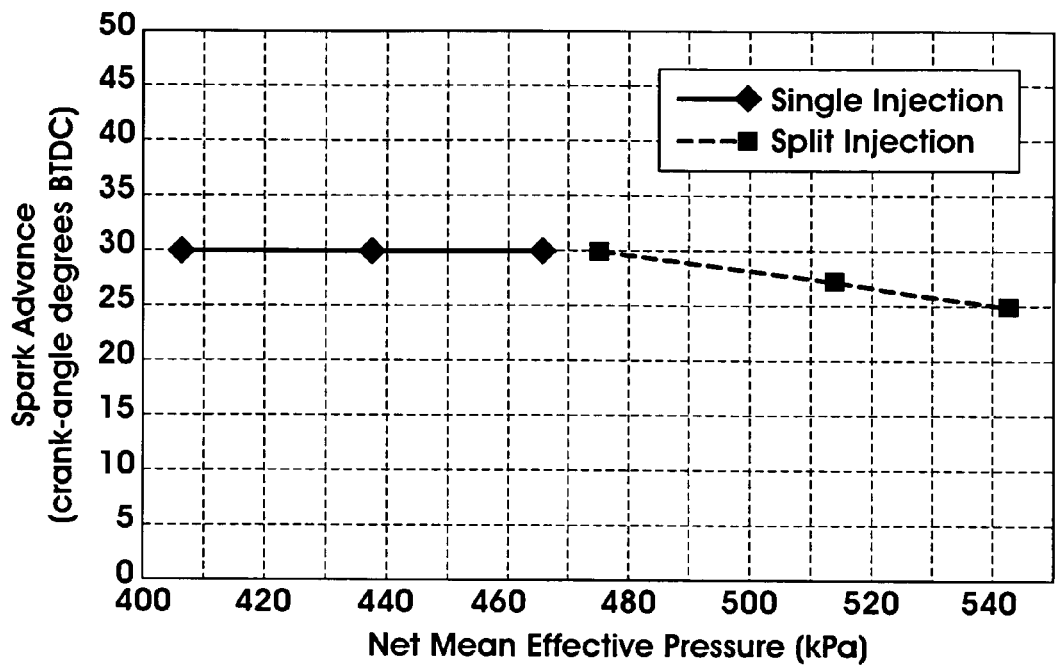
FIG. 6 is a graph of the spark timing as a function of engine load using single and split injection strategies.
Figure 7:
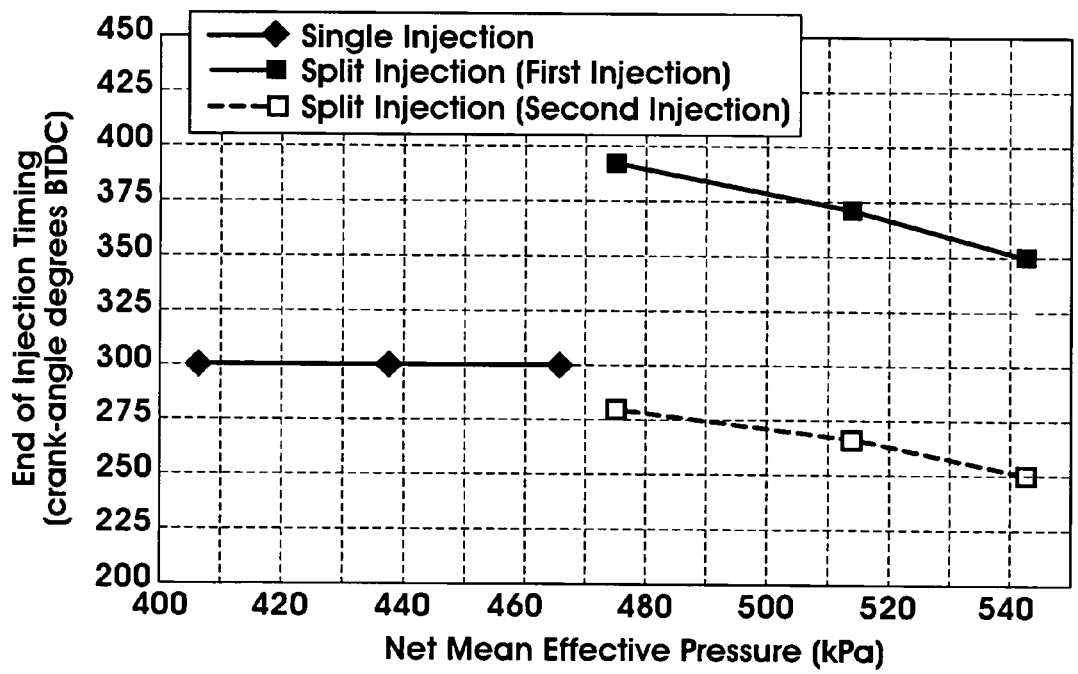
FIG. 7 is a graph of the end of injection timing as a function of engine load using single and split injection strategies.
Figure 8:
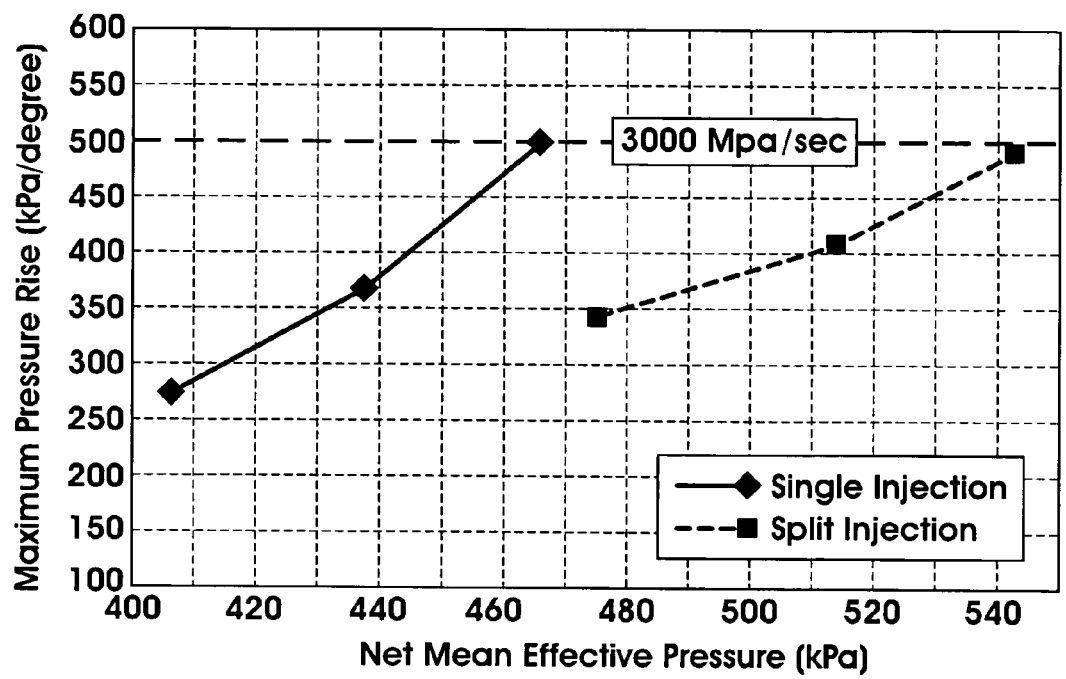
FIG. 8 is a graph of the maximum pressure rise (kPa/deg) as a function of engine load with single and split injection strategies.

Further, with a single injection strategy as shown in FIG. 5, the load increases by increasing the amount of fuel injected while keeping both spark (see FIG. 6) and injection (see FIG. 7) timings the same. The maximum load the engine can operate is about 470 kPa NMEP or 16 mg fuel injection and is determined based on a maximum pressure rise limit of 500 kPa/deg (see FIG. 8). With a split injection strategy, using the amount of split (split half and half as shown in FIG. 5) and the corresponding injection timings (see FIG. 7), the maximum pressure rise can be reduced to around 330 kPa/deg (see FIG. 8) while keeping the negative valve overlap period (see FIG. 4) and spark timing (see FIG. 6) the same as the single injection strategy case.

Figure 9:
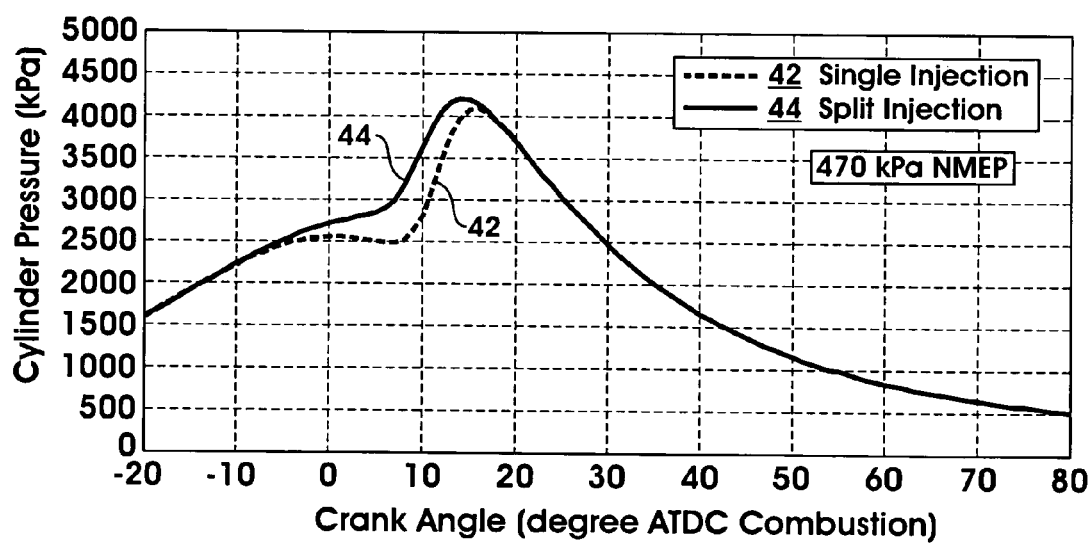
FIG. 9 is a graph of the variations in cylinder pressure as a function of crank angle using single and split injection strategies at 1000 rpm/470 kPa NMEP.
Figure 10:
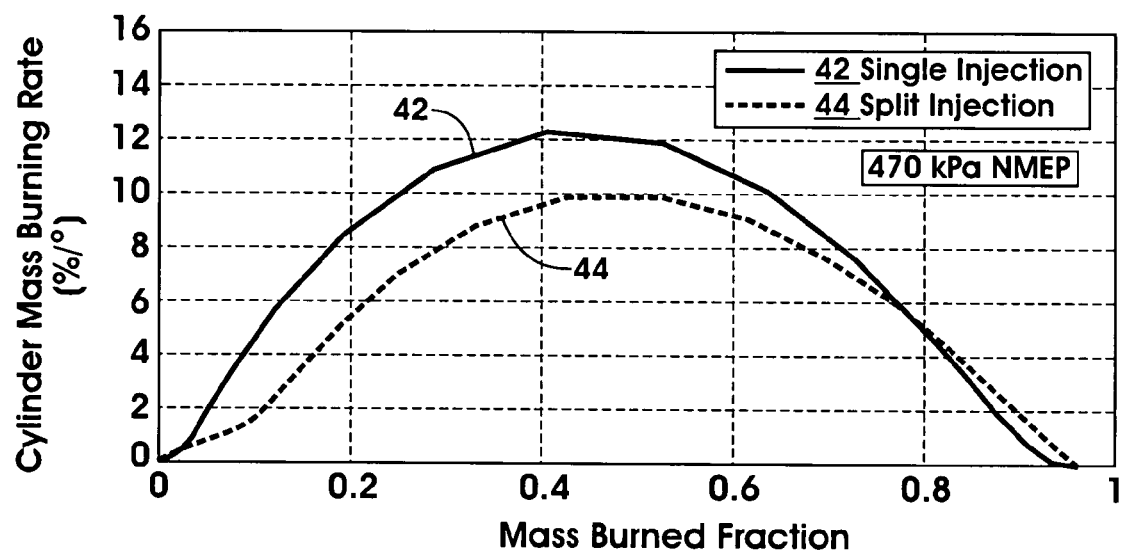
FIG. 10 is a graph of the variations in normalized fuel burning rate versus mass burned fraction using single and split injection strategies at 1000 rpm/470 kPa NMEP.

FIGS. 9 and 10 show respectively variations in cylinder pressure as a function of crank angle and normalized fuel burning rate versus mass burned fraction with single injection (line 42) and split injection (line 44) strategies.

The results clearly indicated that although the combustion starts earlier using split injection, both pressure rise during auto-ignition combustion (see FIG. 9) and the corresponding peak burning rate (see FIG. 10) decrease with split injection. By properly selecting the negative valve overlap period (see FIG. 4), the amount of fuel split (see FIG. 5), and the spark (see FIG. 6) and injection (see FIG. 7) timings, we can operate the engine up to a load of 540 kPa NMEP before the pressure rise exceeds the limit of 500 kPa/deg. This corresponds to about a 15 percent increase in the mid load operation limit.

The present invention applies to other engine speeds as well, although the amount of fuel split and the corresponding injection and ignition timings may vary for best compromise between engine performance, emissions, and combustion stability.

While the intake valve 20 and exhaust valve 24 in the above embodiments are electro-hydraulically actuated, they may be actuated mechanically or electrically using electromagnetic force.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A method for expanding the mid load operation limit in a four-stroke gasoline direct-injection controlled auto-ignition combustion engine having at least one cylinder with direct fuel injection and containing a piston reciprocably connected with a crank and defining a variable volume combustion chamber including an intake valve controlling communication with an air intake and an exhaust valve controlling communication with an exhaust outlet, the method comprising:

operating the engine with two sequential pairs of expansion and contraction strokes during two revolutions of the crank, said two revolutions of the crank defining a combustion cycle;

operating the engine with an overall stoichiometric air/fuel ratio and external EGR dilution;

employing a variable valve actuating system for variably actuating the intake and exhaust valves, said valve actuating system being capable of operating the intake and exhaust valves with one of an exhaust re-compression valve strategy or an exhaust re-breathing valve strategy;

providing a spark plug that extends into said combustion chamber, said spark plug having a spark gap;

employing a fuel injector in communication with said combustion chamber, said fuel injector having multiple injection capability for injecting more than one fuel charge per combustion cycle;

injecting a first fuel charge into the combustion chamber to form a lean air-fuel mixture throughout the combustion chamber;

injecting a second fuel charge into the combustion chamber adjacent the spark plug a period of time after said first fuel charge to form a stratified air-fuel mixture having an ignitable mixture located near said spark plug; and igniting the ignitable mixture at the spark gap, thereby causing spark-ignition combustion, the spark-ignition combustion causing a rise in cylinder pressure and temperature that triggers auto-ignition of the remaining lean air-fuel mixture, and controlling the combustion phasing and burn rate such that higher engine load is attainable before a pressure rise rate in the combustion chamber exceeds a prescribed threshold value.

2. The method of claim 1 including the step of:
selecting a spark timing between 25 and 30 degrees before top dead center with respect to the combustion cycle for triggering said spark plug, said spark plug initiating combustion of the ignitable mixture and causing subsequent auto-ignition of the lean mixture.

3. The method of claim 1, wherein the step of injecting a first fuel charge includes injecting the first fuel charge early in an intake expansion stroke; and
the step of injecting a second fuel charge includes injecting the second fuel charge at a point later in the intake expansion stroke than said first fuel charge.

4. The method of claim 1, including the step of:
selecting a first fuel charge and a second fuel charge that are approximately equal in magnitude;
wherein said first fuel charge is sufficient to form a lean air-fuel mixture that will not ignite at the then existing conditions in the cylinder, and
said second fuel charge is sufficient to form an ignitable air-fuel mixture adjacent the spark plug, which initiates combustion and causes subsequent auto-ignition of the lean mixture.

5. The method of claim 1, including the step of:
selecting a first fuel charge and a second fuel charge that are unequal in magnitude;
wherein said first fuel charge is sufficient to form a lean air-fuel mixture that will not ignite at the then existing conditions in the cylinder, and
said second fuel charge is sufficient to form an ignitable air-fuel mixture adjacent the spark plug, which initiates combustion and causes subsequent auto-ignition of the lean mixture.

6. The method of claim 1, wherein the prescribed threshold value for the pressure rise rate in the combustion chamber is about 500 kPa/degree of crank rotation.

7. The method of claim 1, wherein valve actuation is electro-hydraulic.

8. The method of claim 1, wherein valve actuation is mechanical.

9. The method of claim 1 including selecting an ignition spark timing that is varied as a function of engine speed and load to optimize fuel efficiency and exhaust emission performance.

10. The method of claim 1 wherein the step of controlling combustion phasing and burn rate is carried out in part by controlling internal EGR through the exhaust re-compression or exhaust re-breathing valve strategy.

11. A method for expanding the mid load operation limit in a four-stroke gasoline direct-injection controlled auto-ignition combustion engine having at least one cylinder with direct fuel injection and containing a piston reciprocably connected with a crank and defining a variable volume combustion chamber including an intake valve controlling communication with an air intake and an exhaust valve controlling communication with an exhaust outlet, the method comprising:

operating the engine with two sequential pairs of expansion and contraction strokes during two revolutions of the crank, said two revolutions of the crank defining a combustion cycle;

employing a variable valve actuating system for variably actuating the intake and exhaust valves, said valve actuating system being capable of operating the intake and exhaust valves with one of an exhaust re-compression valve strategy or an exhaust re-breathing valve strategy;

providing a spark plug that extends into said combustion chamber, said spark plug having a spark gap;

employing a fuel injector in communication with said combustion chamber, said fuel injector having multiple injection capability for injecting more than one fuel charge per combustion cycle;

injecting a first fuel charge into the combustion chamber to form a lean air-fuel mixture throughout the combustion chamber;

injecting a second fuel charge into the combustion chamber adjacent the spark plug a period of time after said first fuel charge to form a stratified air-fuel mixture having an ignitable mixture located near said spark plug; and igniting the ignitable mixture at the spark gap, thereby causing spark-ignition combustion, the spark-ignition combustion causing a rise in cylinder pressure and temperature that triggers auto-ignition of the remaining lean air-fuel mixture, which results in the obtaining of a higher engine load before a pressure rise rate in the combustion chamber exceeds a prescribed threshold value; and selecting a spark timing between 25 and 30 degrees before top dead center with respect to the combustion cycle for triggering said spark plug, said spark plug initiating combustion of the ignitable mixture and causing subsequent auto-ignition of the lean mixture.

12. A method for expanding the mid load operation limit in a four-stroke gasoline direct-injection controlled auto-ignition combustion engine having at least one cylinder with direct fuel injection and containing a piston reciprocably connected with a crank and defining a variable volume combustion chamber including an intake valve controlling communication with an air intake and an exhaust valve controlling communication with an exhaust outlet, the method comprising:

operating the engine with two sequential pairs of expansion and contraction strokes during two revolutions of the crank, said two revolutions of the crank defining a combustion cycle;

employing a variable valve actuating system for variably actuating the intake and exhaust valves, said valve actuating system being capable of operating the intake and exhaust valves with one of an exhaust re-compression valve strategy or an exhaust re-breathing valve strategy;

providing a spark plug that extends into said combustion chamber, said spark plug having a spark gap;

employing a fuel injector in communication with said combustion chamber, said fuel injector having multiple injection capability for injecting more than one fuel charge per combustion cycle;

injecting a first fuel charge into the combustion chamber to form a lean air-fuel mixture throughout the combustion chamber;

injecting a second fuel charge into the combustion chamber adjacent the spark plug a period of time after said first fuel charge to form a stratified air-fuel mixture having an ignitable mixture located near said spark plug; and igniting the ignitable mixture at the spark gap, thereby causing spark-ignition combustion, the spark-ignition combustion causing a rise in cylinder pressure and temperature that triggers auto-ignition of the remaining lean air-fuel mixture, which results in the obtaining of a higher engine load before a pressure rise rate in the combustion chamber exceeds a prescribed threshold value;

wherein the step of injecting a first fuel charge includes injecting the first fuel charge early in an intake expansion stroke; and the step of injecting a second fuel charge includes injecting the second fuel charge at a point later in the intake expansion stroke than said first fuel charge.

* * * * *